P. ROSS.
APPARATUS FOR MEASURING AND REGISTERING THE OSCILLATIONS OF VIBRATING BODIES,
SUCH AS MARINE VESSELS, AIRSHIPS, RAILWAY VEHICLES, AND THE LIKE.
APPLICATION FILED APR. 27, 1908.
957,908.
Patented May 17, 1910.
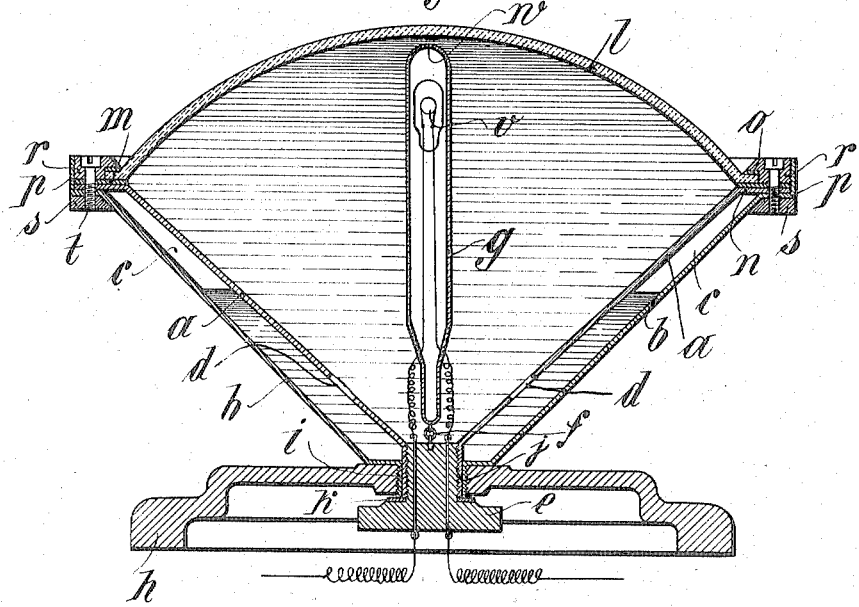
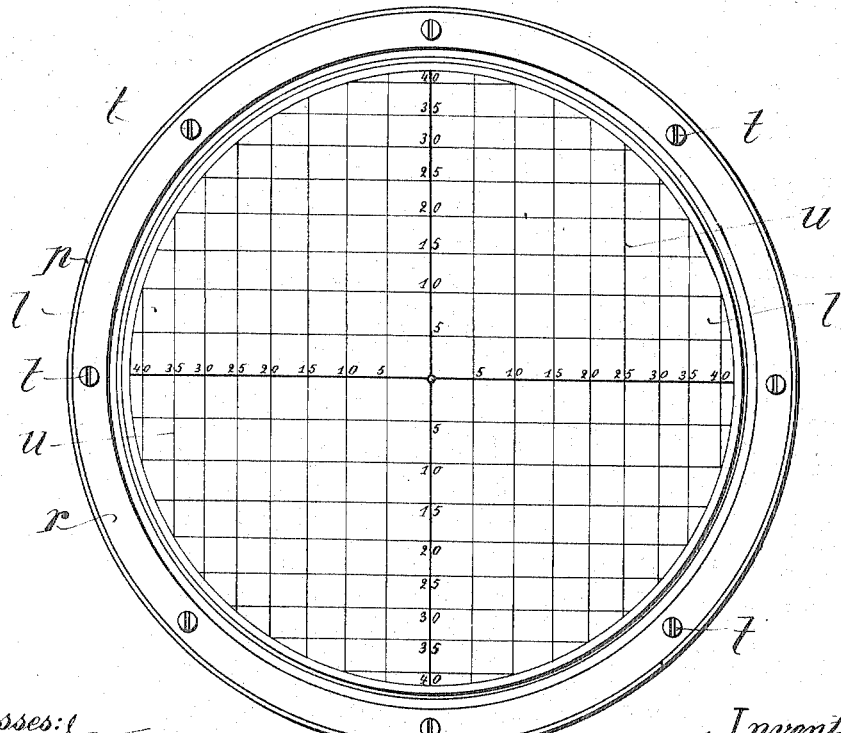
Witnesses:
Hugo Röhme
J. F. H. Jepson
Inventor:
Paul Ross

UNITED STATES PATENT OFFICE.

PAUL ROSS, OF HALBERSTADT, GERMANY.

APPARATUS FOR MEASURING AND REGISTERING THE OSCILLATIONS OF VIBRATING BODIES, SUCH AS MARINE VESSELS, AIRSHIPS, RAILWAY-VEHICLES, AND THE LIKE.

957,908.  Specification of Letters Patent.  Patented May 17, 1910.

Application filed April 27, 1908. Serial No. 429,423.

*To all whom it may concern:*

Be it known that I, PAUL ROSS, a subject of the German Emperor, and resident of Halberstadt, Germany, have invented certain new and useful Improvements in Apparatus for Measuring and Registering the Oscillations of Vibrating Bodies, Such as Marine Vessels, Airships, Railway-Vehicles, and the Like, of which the following is a specification.

This invention relates to an apparatus for measuring and registering the oscillations of vibrating bodies such as marine vessels, air ships, railway vehicles and the like, which overcomes the drawbacks occurring to the hitherto known devices of similar kind by the pendulum indicating the direction of the vertical line being inclosed in a liquid to form a buoyancy pendulum and at its bottom end fixed in such a manner that it is capable of turning freely on all horizontal axes leading through its point of attachment.

The accompanying drawing represents the improved apparatus.

Figures 1 and 2 are respectively a vertical central section and plan of the same.

The apparatus comprises an inner receptacle $a$ which is wholly filled with liquid, and an outer receptacle $b$ which is only partly filled with liquid. The empty space $c$ in the latter receptacle serves to enable the expansion of the liquid at an increase of the temperature in which case the surplus of liquid flows through two opposite openings $d$ into the space $c$ into which also air bubbles are led from the inner receptacle, which might possibly be formed at a sudden cooling of the liquid and which would result in a deviation from the vertical line of the buoyancy pendulum $g$. The latter is inclosed in the inner receptacle and with its bottom end movably attached to the closing stopper $e$ of the latter by means of a suitably constructed joint $f$. In order to prevent, when tilting the apparatus, the air in the space $c$ above the liquid column from escaping through the openings $d$ to the upper part of the inner receptacle $a$, the receptacles $a$ and $b$ are so designed that the space $c$ inclosed by them is narrowed toward its top so that it presents in each cross section approximately the same area. The outer receptacle $b$ is at its lower trunnion-like end $i$ provided with screw-threads and with the latter fixed in a base plate $h$. The lower end $j$ of the inner receptacle $a$ is also trunnion-shaped and provided with internal screw-threads into which the closing stopper $e$ is screwed, a washer $k$ insuring tightness of the latter against escape of liquid. At the upper end the receptacles are closed by a glass bonnet $l$ which rests on a tightening ring $m$ placed on the upper flange $n$ of the inner receptacle $a$. On the outer flange of the glass bonnet also a tightening ring $o$ is disposed. The upper flanges $n$ and $p$ of the inner and outer receptacles respectively, are together with the tightening rings $m$ and $o$, with the flange of the glass bonnet between them, held tightly together by means of an upper ring $r$ and a lower ring $s$ fixed together by means of screws $t$.

The glass bonnet is provided with a graduation $u$ of which the degree lines are arranged in crossed fashion at equal distances from each other. Said graduation can be designated as a net of degrees of latitude, such as is generally employed for measuring the vibrating movements of ships and railway vehicles. On the cutting point of the two middle degree lines or equators the pendulum $g$ assumes the zero-point at the normal equilibrium of the apparatus.

Apparatus which is to serve for reading-off only, is provided with a white buoyancy pendulum having a black pole. Apparatus by which the movement is to be registered, receives in the buoyancy pendulum $g$—which in this case is made of blind glass with a glaring pole—an illuminating source, for instance an electric lamp $v$, which through the pole $w$ shines on sensitized paper directly placed on the glass bonnet. The graduation is thereby at the same time transmitted on the paper.

The improved device allows one to ascertain by a simple glance on the glass bonnet the resulting deviation from the vertical line of the vibrating body, both components being combined in one point. Further an overswinging of the buoyancy pendulum is quite impossible, while the composition of the liquid as to its inner friction may be so chosen as to practically prevent a self-swinging of the pendulum, without impairing the exactness of the indications. The apparatus may be also used in inverted fashion, in which case the weight of the pendulum must of course outweigh the buoyancy.

Having fully described my invention, what I claim and desire to secure by Letters Patent is:—

1. In an apparatus for measuring and registering the oscillations of vibrating bodies, in combination, an inner receptacle wholly filled with liquid and provided with openings, an outer receptacle partly filled with liquid so as to leave an empty space between both receptacles, a closing stopper for said inner receptacle, a buoyancy pendulum arranged in said inner receptacle, a joint to movably attach said pendulum at one end to said stopper, and a glass bonnet arranged on said inner receptacle and provided with a graduation, all for the purpose set forth.

2. In an apparatus for measuring and registering the oscillations of vibrating bodies, in combination, an inner receptacle wholly filled with liquid and provided with openings, an outer receptacle partly filled with liquid so as to leave an empty space between both receptacles, a closing stopper for said inner receptacle, a buoyancy pendulum arranged in said inner receptacle and consisting of blind glass having a glaring pole, a joint to movably attach said pendulum at one end to said stopper, an illuminating source in said pendulum, and a glass bonnet arranged on said inner receptacle and provided with a graduation, all for the purpose set forth.

In testimony whereof I have hereunto set my hand in the presence of two subscribing witnesess.

PAUL ROSS.

Witnesses:
 A. G. PERKINS,
 HENRY WANDER.